United States Patent

[11] 3,587,778

| [72] | Inventor | Peter H. Ellis<br>Chula Vista, Calif. |
|---|---|---|
| [21] | Appl. No. | 874,455 |
| [22] | Filed | Nov. 6, 1969 |
| [45] | Patented | June 28, 1971 |
| [73] | Assignee | Rohr Corporation<br>Chula Vista, Calif. |

[54] SOUND SUPPRESSION NOZZLE STRUCTURE FOR FAN-JET AIRCRAFT ENGINE
9 Claims, 2 Drawing Figs.

[52] U.S. Cl. .................................................. 181/33HC,
181/33HD, 239/127.3, 239/265.17
[51] Int. Cl. .................................................. B64d 33/06
[50] Field of Search ............................................. 181/33, 43,
51, 46, 56, 60, 33.22, 33.221, 33.222; 239/127.3,
265.11, 265.13, 265.17

[56] References Cited
UNITED STATES PATENTS

| 2,633,703 | 4/1953 | Tenney et al. ............... | 181/33(.221) |
| 3,333,772 | 8/1967 | Bruner ........................ | 181/33(.221) |
| 3,463,402 | 8/1969 | Langston ..................... | 181/33(.221) |

FOREIGN PATENTS

| 894,298 | 4/1962 | Great Britain .............. | 181/33(.221) |

Primary Examiner—Robert S. Ward, Jr.
Attorney—George E. Pearson

ABSTRACT: A turbofan jet aircraft engine has a usual tail cone mounted coaxially on the aft rotor bearing housing. A conical housing is mounted coaxially on, and is sealed to the downstream end of the engine exhaust tube to form an exhaust gas plenum chamber between said conical housing and the engine tail cone. The apex of said housing is open to form a central exhaust nozzle, and a plurality of other exhaust nozzles extend radially from the conical housing and extend downstream to terminate in a plurality of concentric, circular rows about the apex nozzle.

A tailpipe is sealed coextensively to the downstream end of the outer wall of the usual annular fan air duct of the engine to enclose an annular space between the conical housing and the tailpipe, through which space extend the curved exhaust nozzles. The downstream ends of the outermost row of nozzles extend outwardly through openings provided therefor in the tailpipe.

A retractable ejector ring for deployment during landing approach and takeoff preferably is provided, and is movable from a deployed position just downstream of the nozzle exit plane to a retracted position enclosing, and flush with, the downstream end of the engine nacelle.

PATENTED JUN28 1971 3,587,778

INVENTOR.
PETER H. ELLIS
BY
George E. Pearson
ATTORNEY 3,587,778

SOUND SUPPRESSION NOZZLE STRUCTURE FOR FAN-JET AIRCRAFT ENGINE

BACKGROUND OF THE INVENTION

It is common knowledge that the suppression of jet aircraft noise is one of the important problems facing the aircraft industry. The almost complete replacement of piston-type engines with jets in recent years, the constant and increasing trend toward larger and more powerful engines, increasing passenger and freight business, location of existing inadequate airports with their approach and takeoff flight paths extending over heavily populated areas, increased legislation against excess aircraft jet engine noise and hostile court decisions all point to the urgency of the problem.

A major portion of the noise from a jet aircraft engine is produced by the shearing encounter of the jetstream of hot, high velocity exhaust gases with the ambient atmosphere. It is well known that reduction in the velocity and temperature of the exhaust gases relative to the velocity and temperature of the atmosphere at their shear zone reduces the noise generated in this zone. Prior attempts at reducing aircraft jet engine noise have included, among others, ambient air ventilated multitube nozzles. When the number of individual nozzles in such an array is great enough for highly effective noise suppression, ventilation of the nozzle tubes on the interior of the array is inadequate, especially at flight speeds. This causes a decrease in noise suppression and an increase in base drag.

PURPOSE OF THE INVENTION

A primary objective of the present invention is to provide an exhaust structure for a fan jet aircraft engine where in the primary exhaust gases are discharged via a plenum chamber through an array comprising a plurality of nozzles, most of which are surrounded by a flow of ducted fan air, thereby more effectively ventilating the central nozzles in the array. The fan air is also partially preheated and expanded, and the exhaust gases are partially precooled and contracted prior to the merging of the exhaust gases with the fan air and ambient atmospheric air downstream of the nozzles.

BRIEF DESCRIPTION OF THE DRAWINGS

The foregoing objectives and advantages of the invention will be apparent from the following description and the accompanying drawings, wherein.

DETAILED DESCRIPTION

Figure 2:
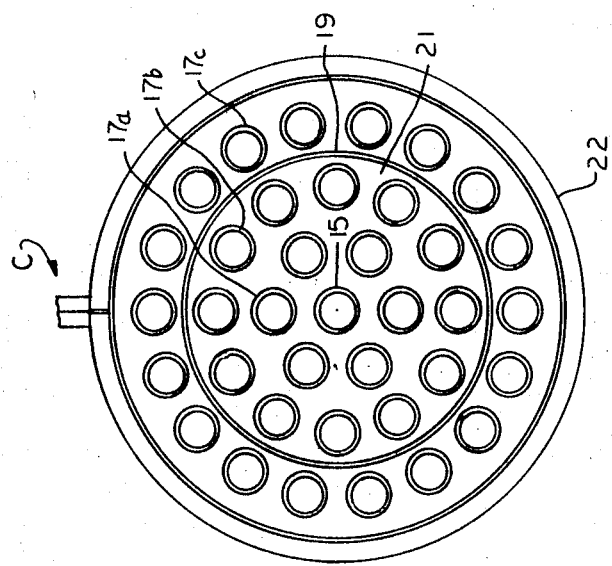
FIG. 2 is an end elevation view of the downstream end of the structure shown in FIG. 2.

Referring to the drawings in detail, a generally conventional turbofan jet aircraft engine A is shown mounted in a well known manner in a nacelle B on the lower end of a conventional wing pylon C. The engine A is surrounded by a conventional annular fan air duct 11, and a usual tail cone 12 is mounted in a customary manner on the engine aft rotor bearing housing 13. Since the engine itself and its mounting structure are conventional and well known to those familiar with jet aircraft engine design and manufacture the details thereof are omitted.

Referring now to the novel features of the invention, a generally conical plenum chamber housing 14 is mounted with its open base coextensive with and sealed to the downstream end of the engine A, and tapers downstream at an apex angle corresponding substantially to that of the engine tail cone 12. The apex of the conical housing 14 is open to comprise a central exhaust nozzle 15, and a plurality of tubular exhaust nozzles 17, arranged in three rows 17a, 17b and 17c, extend radially outwardly from the conical housing 14, and thence are curved downstream to terminate in three circular rows surrounding, and concentric with, the apex nozzle 15 on a common nozzle exit plane identified by the line 16 in FIG. 1.

A converging tailpipe 19 is coextensive with the downstream end of the radially outward wall 20 of the fan air duct 11, and terminates on the nozzle exit plane 16 in the circular space between the downstream ends of the outer row of nozzles 17c, and those of the intermediate row 17b. The downstream end portions of the outer row 17c of exhaust nozzles extend through openings provided therefor in the tailpipe 19, so that these outer nozzles 17c discharge their primary exhaust gases directly into the ambient atmosphere flowing relatively along the exterior of the tailpipe 19. The nozzles of the two inner rows 17a and 17b, and the central or apex nozzle 15 are surrounded by, and discharge their primary exhaust gases into, the stream of fan air from the annular fan air duct 11, which fan air is forced at relatively high speed, and at pressures greater than the ambient atmosphere, through the annular space 21 between the conical housing 14 and the tailpipe 19, and around and among the exhaust nozzles 17a, 17b and 17c.

Figure 1:
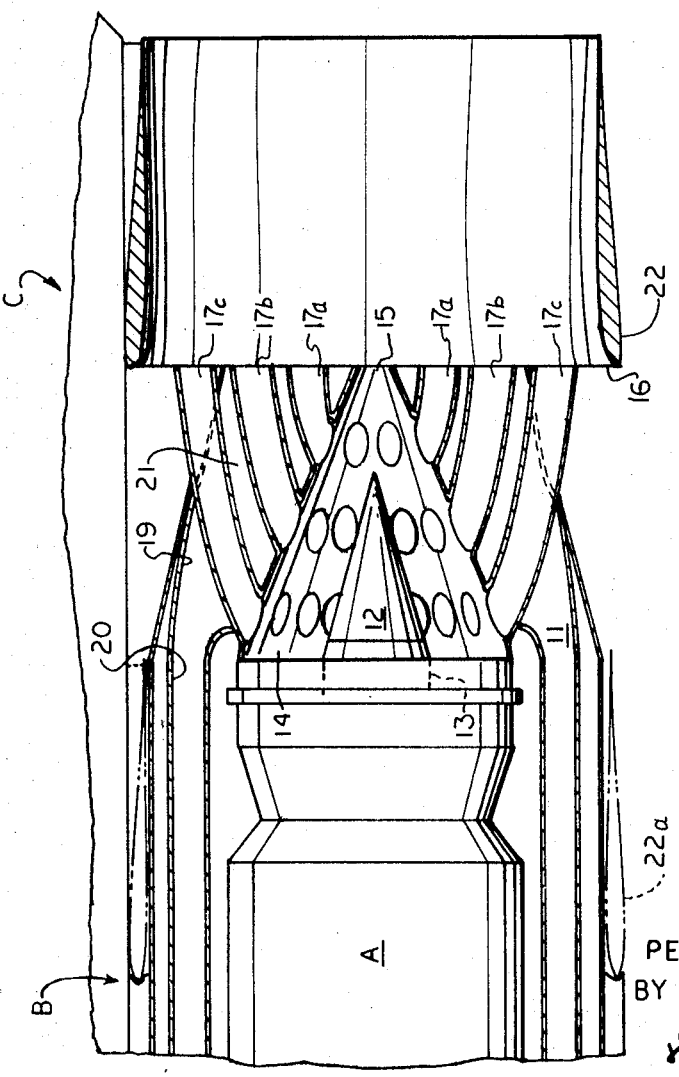
FIG. 1 is a longitudinal, vertical, diametrical sectional view, somewhat diagrammatic, of a fan jet aircraft engine embodying the invention, the curved exhaust nozzles, except those on the plane of section, being omitted.

An additional quieting feature may be provided in the form of an acoustically lined, retractable ejector ring 22, which is mounted for movement coaxially of the engine A from deployed position as shown in solid lines in FIG. 1, with its upstream end substantially coincident with the nozzle exit plane 16, to retracted position as shown in broken lines 22a in FIG. 1, wherein it closely surrounds the downstream end of the engine nacelle B. Conventional thrust reverser doors, now shown, preferably are built into the ejector ring 22 in a well known manner. Suitable means for mounting and operating the ejector ring 22 are disclosed in Pat. application No. 835,281, filed May 15, 1969, and owned by the assignee of the present invention.

OPERATION

With ejector ring 22 in its retracted or inoperative, broken-line position 22a of FIG. 1, primary exhaust gas is discharged from the engine A into the plenum chamber housing 14, and thence through the nozzles 15 and 17. At the same time fan air is discharged from the annular fan air duct 11 through the annular space 21 between the tailpipe 19 and the conical housing 14. Heat transfer from the hot primary exhaust gases flowing through the housing 14 and between and around the nozzles 15 and 17 to the fan air flowing through the annular space 21 tends to cool and contract the exhaust gases, and to heat and expand the fan air. Therefore, when the plurality of streams of hot exhaust gases are discharged from the nozzles 15 and 17a and 17b into the rapidly moving fan air exiting from the tailpipe 19, the differential in heat and velocity between the exhaust gases and the fan air is reduced, while the volume of the preheated fan air is added to that of the exhaust gases to provide added thrust. The nozzles within the tailpipe 19 are well ventilated because they are surrounded by fan air which is at pressures substantially above ambient.

The nozzles of the outer row 17c are surrounded by atmospheric air flowing relatively along the nacelle B and discharge peripherally around the mixture of fan air and exhaust gases discharged from the space 21 enclosed by the tailpipe 19. The nozzles of this outer row 17c are adequately ventilated by ambient air.

The ejector ring 22 when provided is intended to be used only during takeoff and on final landing approach, at which times it is moved from its retracted, broken line position 22a of FIG. 1, to its operative, solid line position of said figure. When thus deployed, the ejector ring 22 exerts its usual and well known pumping function to draw air at high speed inwardly through the gap between the upstream end of the ejector ring 22 and the downstream end of the tailpipe 19, thereby accelerating the airflow past the projecting, outer row 17c of nozzles to reduce the relative velocity between the exhaust gas jets emitted by these nozzles 17c and the ambient air into which they are discharged, and also to aspirate the outer layer of the exhaust gas and fan air mixing zone downstream from the nozzle exit plane 16, all of which factors tends to still further reduce the amount of noise generated.

The invention provides an exhaust gas discharge nozzle structure for a turbofan jet aircraft engine wherein heat transfer from the primary exhaust gases to the fan air prior to discharge of the exhaust gases tends to contract the exhaust gases and to expand the fan air. The exhaust gases are divided into multiple jets, a portion of which are discharged into fan air moving rapidly in the same direction as the exhaust gases, while the remainder are discharged from a single circular row of nozzles into the ambient air close to the periphery of the fan air stream discharged from the tailpipe 19.

Having disclosed our invention, we now claim and desire to protect by Letters Patent of the United States of America:

I claim:

1. In combination with a turbofan jet aircraft engine having an axial exhaust duct surrounded by an annular fan air duct, a sound suppressing nozzle structure comprising an open base housing mounted with its base coincident with the downstream end of the engine exhaust duct and extending downstream therefrom, a first exhaust gas nozzle opening from the downstream end of said housing, a plurality of additional nozzles mounted on said housing and extending downstream alongside the first nozzle, and a tailpipe coextensive with the radially outward side of the engine fan air duct and extending downstream therefrom, said tailpipe enclosing a space through which said nozzles extend.

2. A sound suppressing nozzle structure as claimed in claim 1 wherein a plurality of openings are provided in the tailpipe and a selected plurality of said other nozzles extend through said openings and discharge the exhaust gases passing therethrough radially outwardly of the tailpipe.

3. A sound-suppressing nozzle structure as claimed in claim 2 wherein the downstream ends of said other nozzles are arranged in a plurality of circular rows, concentric with the first nozzle, and the nozzles of the outermost row thereof extend through the openings in the tailpipe.

4. A sound-suppressing structure as claimed in claim 3 wherein the said other nozzles of each concentric row thereof are mounted on a separate zone of the housing, the nozzles of the radially innermost row of said nozzles being mounted in a zone nearest the downstream end of the housing, and the nozzles of the radially outermost row thereof being mounted in a zone nearest the base of the housing.

5. A sound-suppressing nozzle structure as claimed in claim 4 wherein the zones of the housing upon which the nozzles of each row thereof are mounted are in the form of bands extending around the housing parallel to the base of the housing.

6. A nozzle structure as claimed in claim 1 wherein an ejector ring is mounted coaxially of the engine and means are provided to move the ejector ring from a retracted position radially outwardly of the tailpipe and upstream of the downstream end of the tailpipe, to a deployed position just downstream of the downstream end of the tailpipe.

7. A nozzle structure as claimed in claim 1 wherein all of the nozzles terminate at their downstream ends on a common nozzle exit plane normal to the engine axis.

8. A nozzle structure as claimed in claim 1 wherein the housing is in the form of a hollow cone.

9. A nozzle structure as claimed in claim 8 wherein an engine tail cone is mounted with its base substantially coincident with the aft engine rotor bearing housing.